United States Patent
Hanson et al.

(10) Patent No.: US 9,673,742 B2
(45) Date of Patent: Jun. 6, 2017

(54) CONTROLLING MAGNETIC FLUX IN AN AUTOMOTIVE ELECTRIC MACHINE

(71) Applicant: FORD GLOBAL TECHNOLOGIES, LLC, Dearborn, MI (US)

(72) Inventors: Kyle M. Hanson, Madison, WI (US); Edward W. Haran, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 92 days.

(21) Appl. No.: 14/257,194

(22) Filed: Apr. 21, 2014

(65) Prior Publication Data
US 2015/0303837 A1    Oct. 22, 2015

(51) Int. Cl.
| | |
|---|---|
| H02K 17/34 | (2006.01) |
| H02P 1/54 | (2006.01) |
| H02P 5/00 | (2016.01) |
| H02P 5/46 | (2006.01) |
| H02P 21/14 | (2016.01) |
| H02P 5/747 | (2006.01) |
| H02P 9/00 | (2006.01) |
| H02K 17/36 | (2006.01) |
| H02P 6/08 | (2016.01) |

(52) U.S. Cl.
CPC .............. *H02P 21/14* (2013.01); *H02K 17/36* (2013.01); *H02P 5/747* (2013.01); *H02P 6/08* (2013.01); *H02P 9/00* (2013.01)

(58) Field of Classification Search
CPC ........... H02P 5/747; H02P 9/00; H02K 17/36; H02K 17/38; H02K 17/40

USPC .......................................................... 318/46
See application file for complete search history.

(56) References Cited

U.S. PATENT DOCUMENTS

| | | | |
|---|---|---|---|
| 6,373,211 B1 | 4/2002 | Henry et al. | |
| 7,554,281 B2 * | 6/2009 | Satake | B60L 11/1803 318/400.15 |
| 2001/0048226 A1 * | 12/2001 | Nada | 290/40 C |
| 2009/0001996 A1 * | 1/2009 | Rahman | G01M 15/042 324/623 |
| 2009/0071735 A1 * | 3/2009 | Kaneko et al. | 180/65.285 |
| 2011/0050137 A1 * | 3/2011 | Imura et al. | 318/400.15 |
| 2012/0091934 A1 * | 4/2012 | Lindberg | B60W 10/08 318/400.23 |
| 2012/0212169 A1 * | 8/2012 | Wu | H02P 7/285 318/432 |
| 2012/0217911 A1 | 8/2012 | Wu et al. | |
| 2012/0221280 A1 * | 8/2012 | Wu | G01R 31/343 702/113 |
| 2013/0020971 A1 | 1/2013 | Gallegos-Lopez et al. | |
| 2013/0314021 A1 * | 11/2013 | Yamada et al. | 318/718 |
| 2014/0125258 A1 * | 5/2014 | Fulton | H02J 7/1446 318/139 |

\* cited by examiner

*Primary Examiner* — Kawing Chan
*Assistant Examiner* — Bradley Brown
(74) *Attorney, Agent, or Firm* — David B. Kelley; MacMillan, Sobanski & Todd, LLC

(57) ABSTRACT

A method of compensating for magnetic flux resulting from variance from a first electric machine to a second electric machine. A magnetic flux change for the first machine is calculated as a function of a flux difference between the first machine and the second machine. Operation of the first machine is controlled using the magnetic flux change.

8 Claims, 2 Drawing Sheets

CONTROLLING MAGNETIC FLUX IN AN AUTOMOTIVE ELECTRIC MACHINE

BACKGROUND OF INVENTION

The present invention relates to a method of controlling an automotive electric machine and in particular to a method of compensating for a machine to machine variance of magnetic flux.

Torque produced by a synchronous permanent magnet electric machine, such as is used in an automotive vehicle for a traction motor, is dependent on the magnitude of back electromotive force (EMF) of the machine. Variation of the back EMF of the electric machine causes a corresponding variation in the torque output of the machine. Control programming developed for the machine may compensate for at least some of the variation of the back EMF. Typically, the programming compensation is calibrated using a prototype electric machine.

However, the compensation program may not account for back EMF differences due to a machine specific variance from the prototype machine to a production machine. Possible sources of the variance in the production machine includes air gap tolerances, magnet skew, rotor iron, stator winding, magnetization process used, magnet variation, and supporting structure variation, all of which may be compounded when components of the machine are provided by different suppliers. The compensation program may not account for the back EMF from the machine specific variance because the variance is machine and installation specific, which makes the variance difficult to predict before assembling and rotating the machines.

SUMMARY OF INVENTION

An embodiment contemplates a method of controlling a first automotive electric machine. A back electromotive force difference is measured between the first and a second electric machine. A magnetic flux change for the first machine is calculated as a function of the back electromotive force difference. Operation of the first machine is adjusted using the magnetic flux change.

Another embodiment contemplates a method of controlling a first automotive electric machine. A back electromotive force of the machine is measured. A magnetic flux change is calculated between the measured back electromotive force and a baseline back electromotive force. The magnetic flux change is used to adjust operation of the machine.

Another embodiment contemplates a method of controlling a first automotive electric machine. A magnetic flux difference is measured between the first and a second electric machine. A magnetic flux change for the first machine is calculated as a function of the flux difference. Operation of the first machine is adjusted using the magnetic flux change.

An advantage of an embodiment is that the method of controlling an automotive electric machine reduces variation of a torque output of the machine. This will improve efficiency and torque accuracy of the machine.

DETAILED DESCRIPTION

Figure 1:
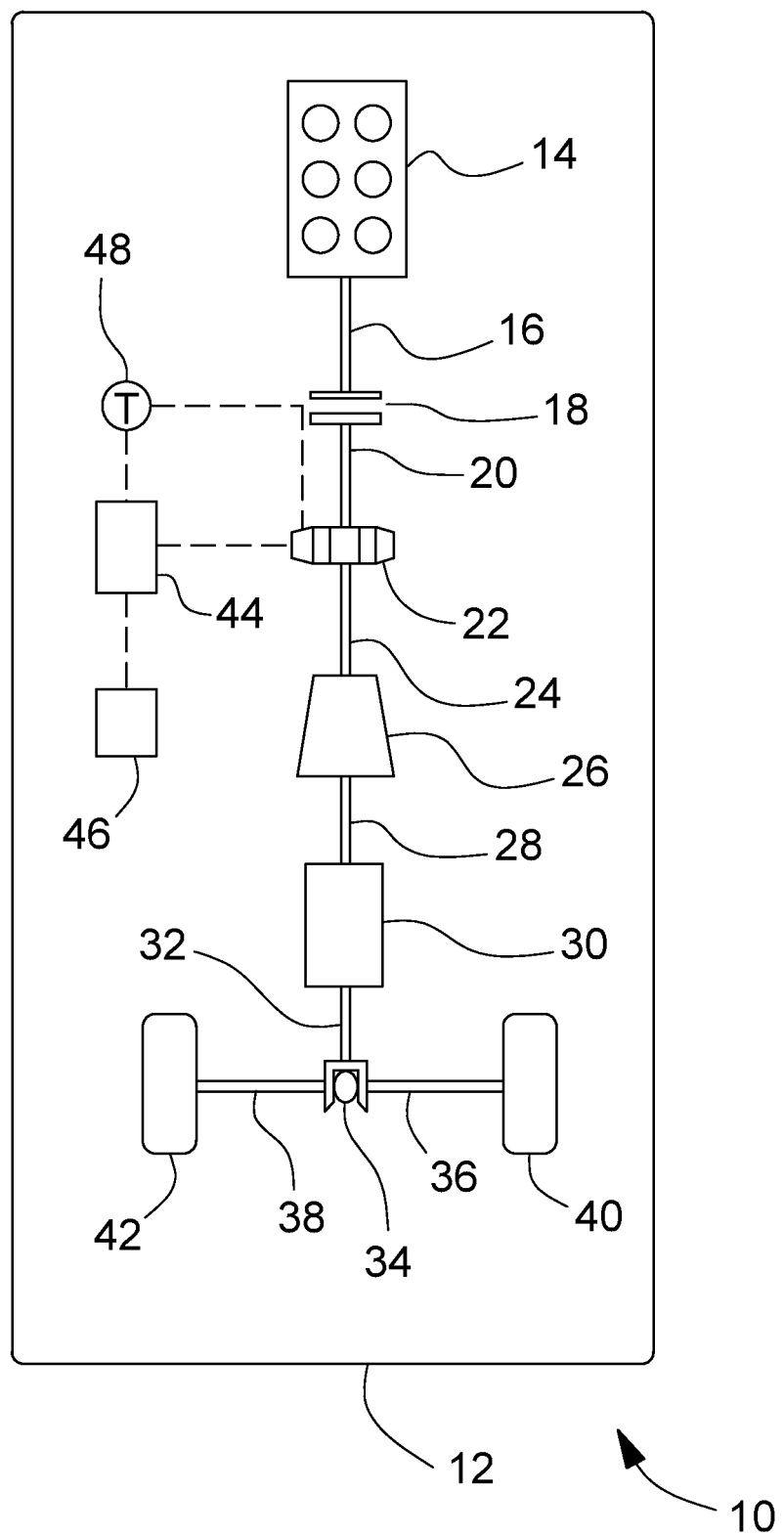
FIG. 1 is a schematic view of a hybrid electric powertrain.

FIG. 1 schematically illustrates a hybrid electric powertrain 10 for an automotive vehicle 12. This powertrain 10 is merely exemplary, and may take other forms, which may be front wheel drive, rear wheel drive, and all wheel drive types of powertrains. As described, the powertrain 10 is a parallel type hybrid electric powertrain but may also be a different powertrain known to one skilled in the art using a synchronous permanent magnet machine 22.

The powertrain 10 includes an internal combustion engine 14 powering a crankshaft 16. Interposed between the engine 14 and the electric machine 22, which may be an electric motor or motor/generator, is a clutch 18. The machine 22 includes a synchronous permanent magnet. When engaged, the clutch 18 connects the crankshaft 16 with an electric machine input 20 and transmits torque between the engine 14 and the machine 22. In turn, the machine 22 transmits torque to a torque converter 26 through a torque converter input 24 and the torque converter 26 transmits torque to a transmission 30 through a transmission input 28. The transmission 30 turns a driveshaft 32 which in turn drives a differential 34. The differential 34 transmits torque to first and second axles 36 and 38, respectively, which drive first and second wheels 40 and 42, respectively. A controller 44 controls operation of the machine 22. The controller 44 is in communication with a data store 46. A temperature sensor 48 measures a temperature of the machine 22 and communicates the temperature with the controller 44.

Figure 2:
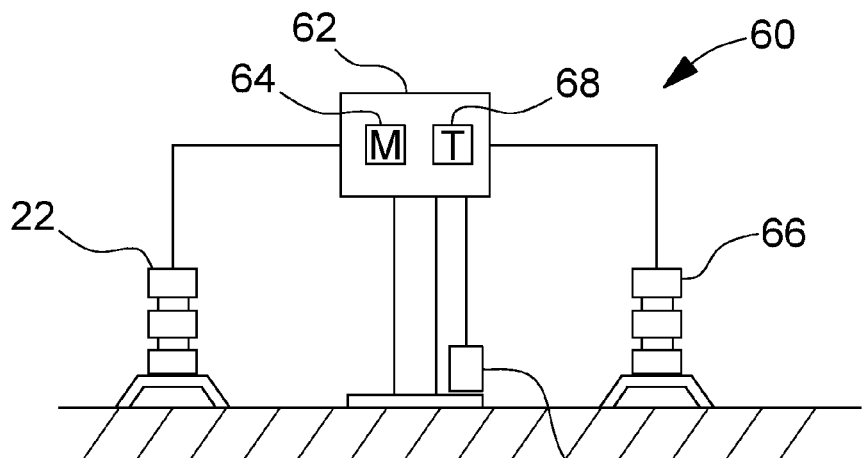
FIG. 2 is a schematic view of an electric machine test bay.

FIG. 2 will now be discussed with reference to FIG. 1. FIG. 2 illustrates a test bay 60 for measuring and recording properties of the machine 22.

The machine 22 is connected to a test stand 62 to measure a specific magnetic flux for the machine 22. The specific magnetic flux may be measured indirectly by measuring a back electromotive force (EMF) of the machine 22 using a voltage sensor 64. The test stand 62 may be an end of line test stand. To more accurately measure the specific magnetic flux for the machine 22, when the machine 22 is connected to the test stand 62, the machine 22 should be mounted in a final housing that will contain the machine 22 in the powertrain 10 and support a rotor and stator of the machine 22. Measuring the specific magnetic flux for the machine 22 while the machine 22 is installed in the final housing allows for the specific magnetic flux to reflect both a machine specific variance and installation variance. For example, when the machine 22 in installed in a transmission housing that also includes the transmission 30, the transmission housing holding both the machine 22 and the transmission 30 should be connected to the test stand 62.

The specific magnetic flux for the machine 22 is measured, as a function of the back EMF of the machine 22, using the voltage sensor 64 at the test stand 62 after the machine 22 is assembled. After being measured, the specific magnetic flux is recorded in the data store 46. A baseline magnetic flux is also recorded in the data store 46. The baseline magnetic flux is a magnetic flux measured for a benchmark electric machine 66. For example, baseline magnetic flux may be a function of a temperature of the benchmark machine 66. The benchmark machine 66 is a prototype electric machine used to program the controller 44 to control the machine 22. To measure the baseline magnetic flux, the benchmark machine 66 is also connected to the test stand 62. As understood by one skilled in the art, the machine 22 and the benchmark machine 66 may be connected to the test stand 62 simultaneously, at different times, or to different test stands 62. Operating temperatures for the machine 22 and benchmark machine 66 may also be recorded by a temperature sensor 68 at the test stand 62. Following measurement at the test stand 62, the machine 22 and data store 46 are installed in the powertrain 10.

Figure 3:
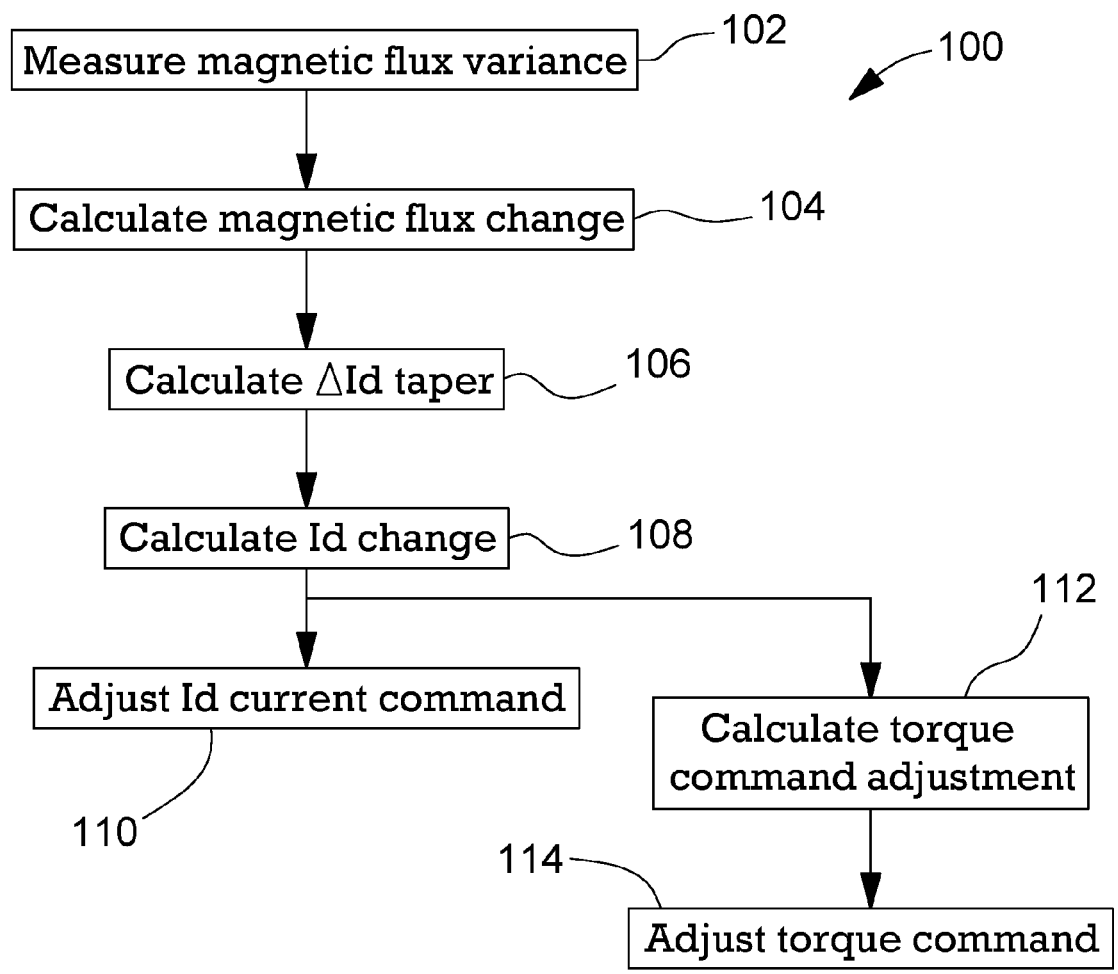
FIG. 3 is a flow chart of an electric machine control routine.

FIG. 3 will now be discussed with reference to FIG. 1. FIG. 3 illustrates a control routine 100 for compensating for back (EMF) from the machine and installation specific variances in the electric machine 22. As understood by one skilled in the art, the back EMF from the machine and installation specific variance may alternatively be measured and compensated for separately.

First, in a step 102, the machine specific magnetic flux is measured for the machine 22 (as discussed for FIG. 2). In a step 104, the specific magnetic flux is reduced by the baseline magnetic flux (stored in the data store 46) to calculate a magnetic flux change for the machine 22.

In a step 106, a taper for a d-axis current, Taper_DeltaId, is calculated. When a full voltage is being applied to the machine 22, the taper is 1.0 (Taper_DeltaId=1.0). When less than the full voltage is being applied to the machine 22, the taper is calculated as: Taper_DeltaId=(M_Index−M_Index_Min)/(M_Index_Max−M_Index_Min), wherein M_Index is a normalized commanded voltage magnitude, M_Index_Min is a minimum normalized commanded voltage magnitude, and M_Index_Max is a maximum normalized commanded voltage magnitude. In a step 108, the taper is used to calculate a d-axis current change. The d-axis current change, $\Delta Id$, is calculated as: $\Delta Id=(-\Delta\lambda m/Ld)(Taper\_DeltaId)$, wherein $\Delta\lambda m$ is the magnetic flux change and Ld is a d-axis inductance of the machine 22.

In a step 110, the controller 44 calculates an adjusted d-axis current command by multiplying an existing d-axis current command by the d-axis current change.

In a step 112, the controller 44 calculates a torque command adjustment, Tadj, as: $Tadj=(3P/2)(Iq\_fb)(\Delta\lambda m-Ldiff*\Delta Id)$, wherein P is a number of poles for the machine 22, Iq_fb is a measured q-axis current for the machine 22, and Ldiff is an inductance difference between the d-axis inductance and a q-axis inductance for the machine 22. The inductance difference is read from an inductance table for the machine 22. The torque command adjustment accounts for an increase in torque due to increased d-axis current and magnetic flux. The controller 44 calculates an adjusted torque command by reducing a torque request by the torque adjustment command.

One skilled in the art will recognize that the control routine 100 for the machine specific variance may be combined with compensating for back EMF from temperature changes in the machine 22 during operation. For example, the magnetic flux change may be calculated as a temperature magnetic flux increased by the specific magnetic flux and reduced by the baseline magnetic flux, wherein the temperature magnetic flux is a function of a temperature of the machine 22 measured by the temperature sensor 48.

While certain embodiments of the present invention have been described in detail, those familiar with the art to which this invention relates will recognize various alternative designs and embodiments for practicing the invention as defined by the following claims.

The invention claimed is:

1. A method of controlling an automotive electric machine comprising:
    adjusting operation of the machine based on a magnetic flux change for the machine that is a function of a back electromotive force of the machine compared to a baseline back electromotive force, and adjusting operation of the machine based on multiplying a predetermined d-axis current command by a d-axis current change; and
    wherein the d-axis current change ($\Delta Id$) is $(-\Delta\lambda m/Ld)$(Taper_DeltaId), where $\Delta\lambda m$ is the magnetic flux change, Ld is a d-axis inductance of the machine, and Taper_DeltaId is 1.0 when a full voltage is applied to the machine and (M_Index−M_Index_Min)/(M_Index_Max−M_Index_Min), when less than a full voltage is applied to the machine, where M_Index is a normalized commanded voltage magnitude, M_Index_Min is a minimum normalized commanded voltage magnitude, and M_Index_Max is a maximum normalized commanded voltage magnitude.

2. The method of claim 1 wherein the magnetic flux is a function of a variance between the machine and a benchmark machine, which is not drivingly connected to the first machine.

3. The method of claim 2 wherein the magnetic flux is additionally a function of a temperature of the machine.

4. The method of claim 1 wherein a current command adjustment is a function of the magnetic flux change and a voltage magnitude.

5. The method of claim 1 wherein operation of the machine is controlled by adjusting a torque command.

6. The method of claim 5 wherein the torque command adjustment is a function of the magnetic flux change, an inductance difference, and a current change.

7. The method of claim 6 wherein the current change is a function of the magnetic flux change and a voltage magnitude.

8. The method of claim 1 wherein the machine is controlled to provide a torque to an automotive powertrain.

* * * * *